May 9, 1933.　　　　R. W. STENZEL　　　　1,907,455
METHOD OF CONTACTING FLUIDS
Filed Dec. 28, 1929
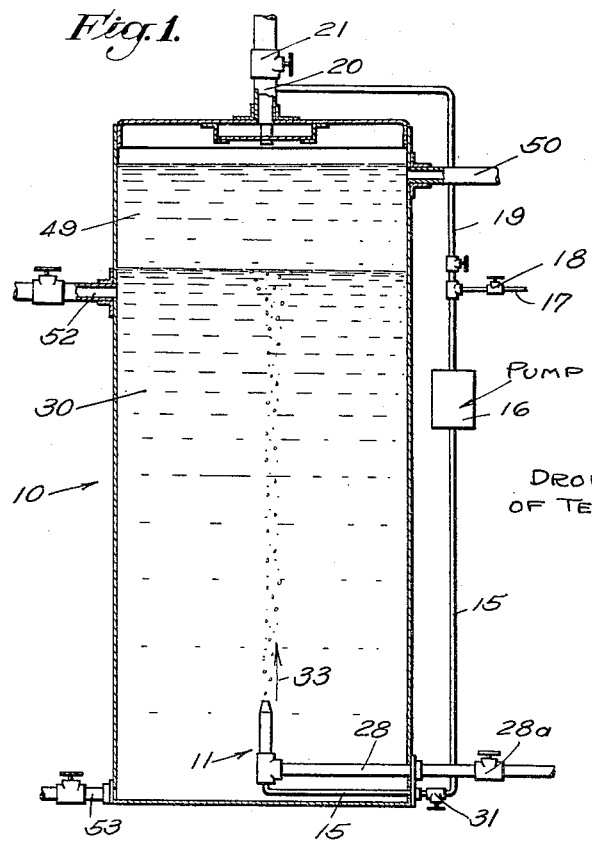
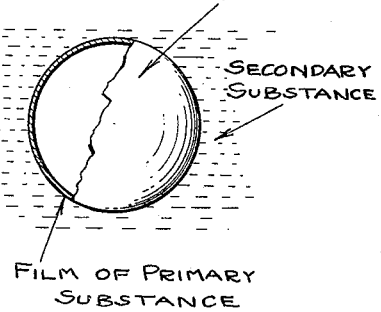
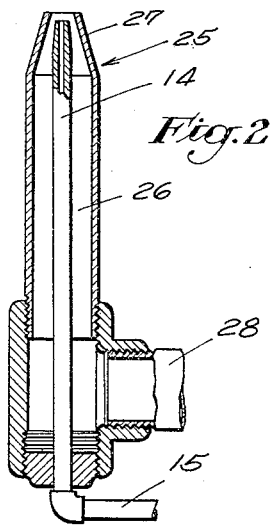
INVENTOR:
RICHARD W. STENZEL,
By
ATTORNEY.

Patented May 9, 1933

1,907,455

UNITED STATES PATENT OFFICE

RICHARD W. STENZEL, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA

METHOD OF CONTACTING FLUIDS

Application filed December 28, 1929. Serial No. 417,126.

My invention relates to the art of contacting two substances for the purpose of achieving a certain chemical or physical interaction therebetween, and is a continuation in part of my application entitled Method of contacting, filed April 10, 1929, Serial No. 353,903, in which is disclosed a novel and improved method of contacting primary and secondary substances in such a manner that the surface-to-mass ratio of the contacting substances may be controlled, and it is an important object of the invention to provide such a method.

One well-known method of contacting two liquids which are of low mutual miscibility is to bubble one liquid through the other. In such a method, the mass of the droplets or bubbles is relatively large, and the surface-to-mass ratio is thus relatively low. The size of such droplets is dependent largely upon the interfacial tension between the two liquids, and also upon the character of the nozzle from which one of the liquids is discharged, as well as on the relative viscosities and relative densities of the liquids. Temperature and pressure also vary the size of droplet. However, in most processes the control of these factors is limited by practical considerations, thus making it impossible to obtain a large surface-to-mass ratio when contacting the two liquids.

In my invention I increase the surface-to-mass ratio by utilizing a third substance, usually a gas, but not invariably so, this tertiary substance being in the form of bubbles or particles which are coated with a thin film of one of the substances and thereafter brought into the vicinity of the other of the substances to be contacted.

It is an object of my invention to provide a novel process in which a film of a primary substance is formed around a particle or bubble of a tertiary substance, this particle or droplet and its film being brought into the proximity of the secondary substance whereupon some interaction may take place between the film of the primary substance and the secondary substance. The tertiary substance thus acts as a carrier for the film and, due to the fact that this film may be very thin, substantially all of the molecules of the one substance may be brought into contact with the other substance.

My process finds one particular utility when two liquids of relatively low mutual miscibility are to be contacted, in which case it is often desirable to utilize a gas as a carrier substance.

It is an object of this invention to provide a process of contacting two liquids of relatively low miscibility in which a gas is bubbled through one of the liquids, each gas bubble having between itself and the surrounding liquid a film of the other liquid.

It is also an object of this invention to provide an efficient means of contacting a primary substance with a secondary substance having a different temperature so as to obtain an efficient transfer of heat from one substance to another.

It is another object to provide a method of forming a uniform and thin film by means of a spreading substance which may be introduced into one of the substances to be contacted and which aids in spreading the primary substance.

Further objects of this invention lie in a novel apparatus in which these processes may be carried out.

In the drawing, I have illustrated such an apparatus, although it should be understood that other apparatus might be utilized for performing the contacting methods of my invention.

Referring to the drawing,—

Fig. 1 is a diagrammatic view of the apparatus of my invention.

Fig. 2 is a detailed sectional view of the nozzle shown in Fig. 1.

Fig. 3 is a greatly enlarged view of a droplet with surrounding film.

Referring particularly to Fig. 1, I have illustrated a container 10 in the lower portion of which a nozzle structure 11 is supported. The details of this nozzle structure are best shown in Fig. 2, which illustrates one type of nozzle structure which I have found to be particularly applicable to my process. This nozzle structure comprises an inner nozzle 14 formed of a suitable tube having a relatively small hole therethrough, this nozzle being supplied with a suitable carrier substance through a pipe 15 which may extend to a pump 16. The carrier substance may be supplied to the pump through a pipe 17 having a valve 18 therein, or may be supplied from a valved pipe 19 communicating with a vent 20 at the upper end of the container 10, this vent having a valve 21 therein.

Surrounding the inner nozzle 14, and concentric therewith, is an outer nozzle 25, there being an annular space 26 between these nozzles. The upper end of this space is restricted by a tapered portion 27 of the outer nozzle, this portion preferably extending slightly above the top of the inner nozzle 14, as clearly shown in Fig. 2. The lower end of the annular space 26 is supplied with a primary substance through a pipe 28 having a valve 28a therein, which controls the amount of the primary substance entering the nozzle structure 11.

The container 10 retains a body of secondary substance indicated by the numeral 30 through which the primary substance and the carrier substance (otherwise termed a tertiary substance) must pass after being discharged from the nozzle structure 11.

If the opening in the inner nozzle 14 is sufficiently small so that a droplet of the tertiary substance forms at the opening of this nozzle, this droplet will tend to separate itself from the nozzle and rise through the secondary substance 30, provided, of course, that the density of the tertiary substance is less than that of the secondary substance, as is usually the case when utilizing the apparatus shown in Fig. 1. I have found, however, that with the inner and outer nozzles arranged as shown in Fig. 2, this droplet of tertiary substance will be coated by a thin film of the primary substance which passes through the pipe 28 and is discharged through the annular space 26. The thickness of this film depends upon a number of factors, including primarily the size of the droplet and the relative rates at which the primary and tertiary substances are supplied through the nozzle structure. The size of droplet may, of course, be made smaller, say by decreasing the size of orifice in the central nozzle 14, but with a given size of orifice, I have found it possible to control the thickness of the film by controlling the amount of primary substance supplied through the pipe 28, the flow of this primary substance being controlled by the valve 28a, or by varying the pressure developed by the pump 16. Similarly, the amount of tertiary substance supplied to the inner nozzle 14 through the pipe 15 may be controlled by a valve 31.

The explanation of this formation of a film of primary substance around a droplet or particle of tertiary substance, I believe to be as follows:

Considering that a droplet of the tertiary substance with its associated film has just risen from the mouth of the nozzle structure, it should be clear that the primary substance in the annular space 26 has an opportunity to momentarily cover the opening of the orifice of the inner nozzle 14 so that as more of the tertiary substance is supplied to this nozzle, and the droplet begins to form, this droplet is surrounded by a film of the primary substance. As the droplet becomes larger, there is a tendency for it to rise until finally only a small tail connects the droplet with the body of tertiary substance inside the nozzle 14. This tail becomes thinner and thinner, due to the increasing size of the droplet and the greater upward force thereon caused by the difference in gravity between this droplet and the secondary substance, until finally the molecular forces in the tail are not strong enough to retain the droplet, and failure takes place, the droplet rising through the secondary substance as indicated by the arrow 33 of Fig. 1. During the formation of such a tail, the secondary substance, of course, surrounds this tail, so that the instant the tail breaks, the secondary substance heals the opening left by the small tail just prior to breaking.

In disclosing this method, it is not desired to be limited in the nature of the material of which the nozzles are made. In fact, it has been found beneficial to suit the material to the particular type of contact to be made. For instance, when an oil as the primary substance is to be contacted with say an aqueous solution as the secondary substance, however, it has been found that better operation is obtained when the nozzles are made of an oil-wetted material such as brass, iron, etc., than when the nozzles are made of glass. In general, it may be said that the nozzles should be made of a material which is preferentially wetted by the primary substance being contacted.

With the apparatus illustrated in Figs. 1 and 2 I have found it possible to make the film of primary substance extremely thin. In fact, my experiments lead me to believe that this film can be made one molecule thick. In other words, only one layer of the molecules of the primary substance will be present in the film. Thus, if the film of primary substance is but one molecule thick, it follows that all of the molecules in this film are contacted by the secondary substance as the droplet of tertiary substance and its associated film rises therethrough. This very nearly approaches the ideal maximum for a surface-to-mass ratio of two contacting substances which, no doubt, accounts for the excellent results obtainable by the use of this process.

The particular primary, secondary, and tertiary substances utilized depend, of course, upon the particular process in which this method of contacting is used. The primary and the secondary substances are usually the ones which it is desired to contact, the tertiary substance acting ordinarily as a carrier to form a core for the film of primary substance, and to move this film through the body of secondary substance.

If the primary and secondary substances comprise two liquids of relatively low mutual miscibility, it is ordinarily desirable to use a gaseous substance as a tertiary or carrier substance, but in certain applications a tertiary liquid may be utilized. The controlling factor relative to the tertiary substance is usually one of density; in other words, the average density of the particle or droplet comprising tertiary substance and the film of primary substance therearound, must be less than the density of the secondary substance if the apparatus illustrated in Fig. 1 is to be utilized. In other words, in order for the droplets to rise as indicated by arrows 33, this average density must be less than the density of the secondary substance. If the nozzle structure 11 were positioned at the top of the container 10, the opposite would be true. In this instance, it would be desirable that the average density of each droplet be greater than the density of the secondary substance so that the droplets with their associated films would drop therethrough.

So also, my contacting method may be utilized for contacting a liquid and a gas, or a liquid and a vapor, or a liquid and certain suspensions. In this event, it is desirable to utilize the gas, vapor, or suspensions as the secondary substance, and to utilize the liquid in forming the films surrounding the particles or droplets of tertiary substance.

It has been found that when the primary and secondary substances are liquids which are to be contacted and when the tertiary substance is a gas, the greatest effectiveness of contacting, i. e., the thinnest and most uniform form of the primary liquid at the interface between the gas and the secondary liquid, is formed when the primary liquid has the property of spreading quickly and uniformly over the interface. In some cases this spreading tendency is an inherent property of the primary substance, and in others, it is sometimes advantageous to add a spreading material to impart the desirable spreading characteristics. Such a spreading material may be added to either the primary or secondary substances, and often only a small amount is necessary to produce very effective results.

Many applications of my method of contacting two substances will be apparent to those skilled in the art and I am thus not limited to any particular use of my method although a few examples of its application will be given. For instance, the contacting of two liquids by my method finds utility in the treatment of petroleum and its products by liquids, for instance, the sulphuric acid treatment of gasoline, kerosene, lubricating oils, etc., or the treatment of petroleum products or other substances with liquid sulphur dioxide. Furthermore, one liquid or solution may be very easily and effectively washed by another liquid by the use of my process. Examples of this type are numerous, and include the washing of a liquid with an alkali solution after acid treatment of the liquid, the washing of vegetable oils as in the soap industry, the washing of tar to remove ammoniacal liquor, the washing of oils to free them of phenols, etc.

Examples of contacting a liquid with a gas or vapor lie in the absorption of natural gasoline from natural gas, the purification of gases in the gas industry, etc.

When an organic liquid, such as petroleum, is the primary substance which is to be contacted with a secondary substance, such as an aqueous solution, the tendency of the primary fluid to spread over the interface between the gas and the secondary liquid may be materially increased by adding a spreading material as has already been described. Such a spreading material may be pine oil, cresol, oleic acid, iso-amyl alcohol, alpha-naphthylamine, potassium xanthate and similar substances.

Another application consists in supplying heat to a crude oil emulsion which contains scale-forming constituents and which normally deposits this scale on the surfaces through which heat is being transferred and thus materially decreases the heat transfer efficiency. Heat may be very efficiently transferred to a thin film of oil (primary substance) by contacting with a hot liquid (secondary substance).

This method of contacting is applicable both to large commercial installations and to laboratory experiments, the main difference being only in the number and size of nozzles utilized. In other words, the greater the number of nozzles, the greater the capacity.

The apparatus shown in Fig. 1 is thus only diagrammatic, and in this figure I have shown the stratification which might take place in the container if gasoline is introduced through the pipe 28 and compressed air or gas through the pipe 15, the sulphuric acid being the body of secondary substance 30. Films of the gasoline are formed around the gas droplets and rise through the sulphuric acid until they reach the surface thereof. At this point the gasoline film unites with a body of treated gasoline 49 above the sulphuric acid, any excess of which is withdrawn through a pipe 50. The gas continues to rise through the body of treated gasoline and is liberated at the surface thereof, this gas collecting in the upper part of the container and being withdrawn therefrom through the vent 20 when the valve 21 is open. In the event that the gas is to be recirculated the valves 21 and 18 are closed, thus allowing the gas to be drawn into the pump 16. The sulphuric acid may be renewed from time to time as its effectiveness becomes less by introducing a new supply through a pipe 52 and withdrawing a corresponding amount through a pipe 53.

While I have shown and described my method as being performed by one type of apparatus, it should be understood that I am not limited to this particular apparatus. Similarly, I am not limited to contacting two liquids, although I have found this process to be especially adapted to such contacting. Furthermore, it is not necessary that these two liquids be immiscible, or even that they have different densities, although such immiscibility and difference in density make for ready separation of the two when such separation is desired.

I claim as my invention:

1. A method of bringing a primary and a secondary liquid substance into intimate contact, which comprises: coating a particle of a tertiary substance with a thin film of said primary liquid substance; and moving said tertiary substance with its film of primary liquid substance through said secondary liquid substance.

2. A method of bringing a primary and a secondary liquid substance into intimate contact, which comprises: coating a particle of a tertiary substance with a thin film of said primary liquid substance, the average density of said particle of tertiary substance together with its film of primary liquid substance being less than the density of said secondary liquid substance; and introducing said particle of tertiary substance and its film of primary liquid substance into a body of said secondary liquid substance and below the surface level thereof.

3. A method of contacting a primary and a secondary liquid, which comprises: bubbling through a body of said secondary liquid gas particles enclosed in a thin film of said primary liquid.

4. A method of contacting primary and secondary liquids of low mutual miscibility, which comprises: coating a gas particle with a thin film of said primary liquid; introducing the coated gas particle below the surface level of a body of said secondary liquid; collecting said gas liberated above said secondary liquid; and withdrawing said primary liquid from above said body of said secondary liquid.

5. A method of transferring heat from one liquid substance to another which includes the steps of: surrounding a tertiary particle with a thin film of one of said substances which is at a temperature different from the temperature of the other of said substances; and passing said particle and its associated film into contact with the other of said substances.

6. A method of bringing a primary and a secondary substance into intimate contact, which comprises: introducing a spreading material into one of said substances; coating a particle of a tertiary substance with a thin film of said primary substance by the aid of said spreading material; and moving said tertiary substance with its film of primary substance through said secondary substance.

7. In combination: a container containing a body of secondary substance; a nozzle structure discharging below the surface of said secondary substance and providing concentric passages through which primary and tertiary substances may move, said nozzle structure being formed of a material which is preferentially wetted by said primary substance; and means for so supplying primary and tertiary substances to said nozzle means that particles of said tertiary substance become coated with a film of said primary substance and are discharged into said body of said secondary substance.

8. A method of contacting a primary and a secondary substance, which comprises: coating a particle of a tertiary substance with a thin film of said primary substance, the average density of said particle of tertiary substance together with its film of primary substance being more than the density of said secondary substance; introducing said particle of tertiary substance and its film of primary substance into a body of said secondary substance near the surface level thereof; and collecting said tertiary substance and said primary substance near the bottom of said secondary substance.

9. A method as defined in claim 1 in which said primary liquid substance and said secondary liquid substance are of such character as to interact with each other during the movement of said tertiary substance and its film of primary liquid substance through said secondary liquid substance.

10. A method as defined in claim 1 including the additional step of separating said primary, secondary, and tertiary substances after said tertiary substance with its film of primary liquid substance has moved through said secondary liquid substance.

11. A method as defined in claim 1 including the additional step of collecting said gas particles above said body of secondary liquid.

12. A method as defined in claim 6 in which said primary and secondary substances are liquids and in which said spreading material is added to the liquid comprising said primary substance.

In testimony whereof, I have hereunto set my hand at Los Angeles, California, this 23rd day of December, 1929.

RICHARD W. STENZEL.

CERTIFICATE OF CORRECTION.

Patent No. 1,907,455.  May 9, 1933.

RICHARD W. STENZEL.

It is hereby certified that error appears in the printed specification of the above numbered patent requiring correction as follows: Page 5, line 3, claim 11, for the claim number "1" read "3"; and that the said Letters Patent should be read with this correction therein that the same may conform to the record of the case in the Patent Office.

Signed and sealed this 11th day of July, A. D. 1933.

M. J. Moore.

(Seal) Acting Commissioner of Patents.